E. M. STAPLES.
AUTOMATIC SPRING GOVERNOR.
APPLICATION FILED MAR. 3, 1916.
1,194,895.
Patented Aug. 15, 1916.
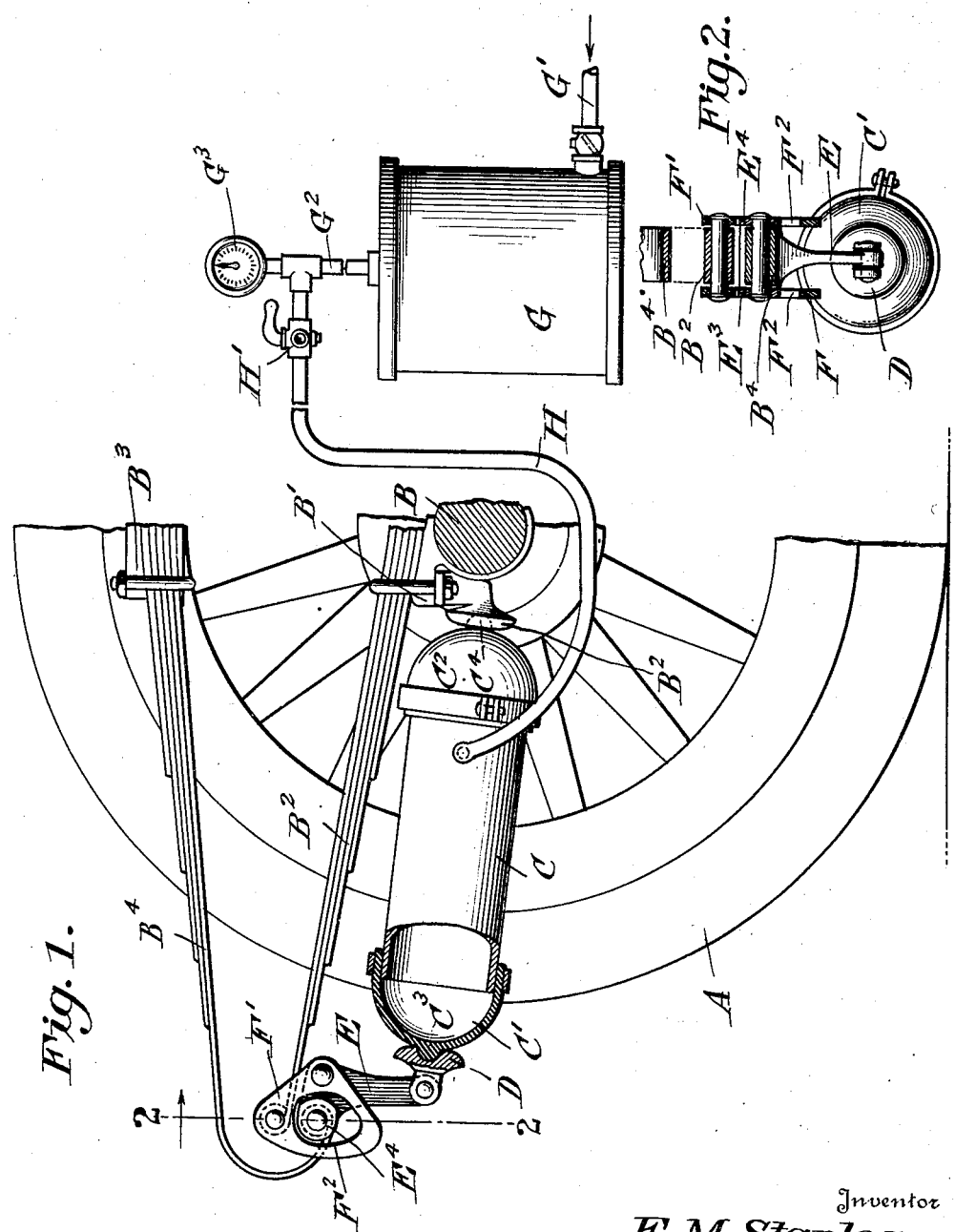
Witnesses
Inventor
E. M. Staples
By Frankle N. Hough
Attorney

UNITED STATES PATENT OFFICE.

ELIAL M. STAPLES, OF ELIZABETH, NEW JERSEY.

AUTOMATIC SPRING-GOVERNOR.

1,194,895.  Specification of Letters Patent.  Patented Aug. 15, 1916.

Application filed March 3, 1916. Serial No. 81,953.

*To all whom it may concern:*

Be it known that I, ELIAL M. STAPLES, a citizen of the United States, residing at Elizabeth, in the county of Union and State of New Jersey, have invented certain new and useful Improvements in Automatic Spring-Governors; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in an adjustable pneumatic cushioning apparatus for automobiles and the like and it has for its object to provide an easy riding effect which may be quickly adjusted to adapt itself to various loads or number of passengers carried by an automobile or other vehicle.

Another object is to provide a pneumatic cushion arrangement, having a controlling valve within easy reach of the operator, by which he may quickly adjust the cushioning effect to accommodate any overload or underload caused by an increase or decrease of load or number of passengers of an automobile.

A further object of the invention is to provide means, simple in construction, which will automatically adapt itself to an overload and thus relieve and prevent breaking of any of the cushioning mechanism.

In the accompanying drawings, forming a part of this specification, the invention is illustrated in connection with the springs of an automobile and in said drawings: Figure 1 is a side elevation, partly in section, of my invention as applied, and Fig. 2 is a section taken on line 2—2 of Fig. 1.

Reference now being had to the details of the drawings by letter, A designates the wheel of an automobile, and B the axle having secured thereto a clip B' for rigidly holding the lower spring $B^2$, and secured to the body of an automobile (not shown) as by a clip $B^3$ is an upper spring $B^4$. A compressed air cylinder C, having semi-spherical flexible ends C' and $C^2$, preferably of rubber secured to the ends thereof, is held in place by load compression and air expansion. Said ends C' and $C^2$, as shown in cross section, are hollow and are provided on their outer apices with suitable anti-slipping lugs $C^3$ and $C^4$, the lug $C^4$ having a bearing in a semi-spherical extension $B^2$ of the clip B', and the lug $C^3$ having a bearing in a recess in the compression member D, which is pivotally connected to the lower end of a lever E which has its upper end pivoted to the end of the upper spring $B^4$.

Link plates F and F' have their upper ends pivoted to the end of the lower spring $B^2$ at a point directly above the pivotal point of the lever E with the spring $B^4$, as shown. The lever E is provided with two lugs $E^3$ and $E^4$ between which the end of the spring $B^4$ is mounted and the lugs extend laterally through openings $F^2$ in the plates F and F'. Said lugs, in case of extreme overload, will automatically contact with the lower edge of the opening $F^2$ in the link plates F and F' and serve to prevent damage being done to the cushioning mechanism by said overload. A compressed air storage tank G is located within the automobile and is provided with a supply pipe G' and a pipe $G^2$ carrying an air gage $G^3$, as shown. Leading from the pipe $G^2$ to the air cushion cylinder C is a pipe H having a 3-way valve H' mounted therein, said valve being located within easy reach of the operator, so that he may manipulate the same to increase the air pressure within the tank in case of an increase of load on the vehicle or decrease the pressure within the cylinder as the case may require by simply turning the valve slightly so as to exhaust to the atmosphere.

It will be noted that the area of the contacting surfaces of the flexible cylinder ends C' and $C^2$ and the contacting surfaces of the rounded members D and $B^2$ are varied in proportion to the amount of pressure exerted thereon.

What I claim to be new is:—

1. A cushioning apparatus, comprising a cylinder having flexible heads, means for admitting air to the cylinder, an abutment carried by the vehicle axle and bearing against one of said heads, a lever pivoted to the body spring of the vehicle and carrying an abutment which bears against the other head, and a link pivoted to the axle spring and also to the lever and having an opening which receives a portion of the lever for limiting the swinging movement thereof.

2. An apparatus for cushioning a vehicle comprising a cylinder having integral lugs thereon, an axle spring, link plates pivoted to the latter, a lever pivoted to said link plates, a body spring pivoted to said lever, socket abutment members, one secured to the axle and the other pivoted to said lever, portions of lateral projections of the lever adapted to bear against portions of said link plates when the springs are under heavy tension.

In testimony whereof I hereunto affix my signature in presence of two witnesses.

ELIAL M. STAPLES.

Witnesses:
 EMMA L. BEUTTENMILLER,
 JOHN MILLER.